(12) United States Patent
Kim

(10) Patent No.: US 8,819,315 B2
(45) Date of Patent: Aug. 26, 2014

(54) STORAGE DEVICE WITH DISPLAY UNIT AND METHOD OF DISPLAYING INFORMATION

(75) Inventor: Kwang jun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 12/512,847

(22) Filed: Jul. 30, 2009

(65) Prior Publication Data

US 2010/0030921 A1 Feb. 4, 2010

(30) Foreign Application Priority Data

Aug. 4, 2008 (KR) .................. 10-2008-0076201

(51) Int. Cl.
*G06F 13/12* (2006.01)
*G06F 13/38* (2006.01)
*G06F 3/00* (2006.01)
*G06F 13/36* (2006.01)

(52) U.S. Cl.
CPC .................................. *G06F 13/122* (2013.01)
USPC ................ 710/74; 710/10; 710/306; 715/762

(58) Field of Classification Search
CPC ........... G06F 3/01; G06F 13/12; G06F 13/38; G06F 3/00; G06F 13/36; G06F 13/122
USPC .................... 710/10, 306; 715/762
See application file for complete search history.

(56) References Cited

U.S. PATENT DOCUMENTS

| | | | |
|---|---|---|---|
| 6,720,983 B1 * | 4/2004 | Massaro et al. | 715/846 |
| 2004/0103174 A1 * | 5/2004 | Balducci et al. | 709/221 |
| 2006/0095647 A1 * | 5/2006 | Battaglia et al. | 711/100 |
| 2007/0022233 A1 * | 1/2007 | Bridges et al. | 710/62 |
| 2007/0065119 A1 * | 3/2007 | Pomerantz | 386/125 |
| 2007/0115761 A1 | 5/2007 | Song | |
| 2007/0130413 A1 * | 6/2007 | Yetukuri | 711/103 |
| 2007/0276828 A1 * | 11/2007 | Au et al. | 707/7 |
| 2008/0261450 A1 * | 10/2008 | Nguyen et al. | 439/607 |
| 2009/0189904 A1 * | 7/2009 | Roth | 345/467 |
| 2009/0198922 A1 * | 8/2009 | Liu | 711/154 |
| 2009/0248615 A1 * | 10/2009 | Drory et al. | 707/2 |
| 2009/0259796 A1 * | 10/2009 | Awyong et al. | 711/102 |
| 2010/0017366 A1 * | 1/2010 | Robertson et al. | 707/3 |
| 2010/0039225 A1 * | 2/2010 | Yu et al. | 340/5.83 |
| 2011/0016405 A1 * | 1/2011 | Grob et al. | 715/740 |

FOREIGN PATENT DOCUMENTS

| | | |
|---|---|---|
| JP | 10-230080 A | 9/1998 |
| KR | 10-2000-0051236 | 8/2000 |
| KR | 10-2005-0096416 | 10/2005 |
| KR | 10-2007-0080918 A | 8/2007 |
| KR | 20-2008-0002108 | 6/2008 |

OTHER PUBLICATIONS

Korean Office Action issued on May 28, 2014 in counterpart of Korean Application No. 10-2008-0076201 (4 Pages in Korean, 4 Pages in English).

* cited by examiner

*Primary Examiner* — Farley Abad
(74) *Attorney, Agent, or Firm* — NSIP Law

(57) ABSTRACT

A portable storage device includes a display unit that allows a user to easily determine the content stored in the storage device independent of any connection to another device. The storage device extracts information that represents data stored in the data storage unit based on user settings or a search history and displays the information. Accordingly, the information stored in the storage device may be easily categorized and identified.

28 Claims, 4 Drawing Sheets

STORAGE DEVICE WITH DISPLAY UNIT AND METHOD OF DISPLAYING INFORMATION

CROSS REFERENCE TO RELATED APPLICATIONS

This application claims the benefit under 35 U.S.C. §119(a) of Korean Patent Application No. 10-2008-0076201, filed on Aug. 4, 2008, the disclosure of which is herein incorporated by reference in its entirety for all purposes.

BACKGROUND

1. Field

The following description relates to a storage device, and more particularly, to a storage device having a display unit that allows a user to determine the contents stored in the storage device.

2. Description of the Related Art

With the rapid development of memory-related technologies, the cost of owning memory devices has significantly dropped. As a result, users now own and carry multiple storage devices to store various types of data. Generally the most commonly used portable storage devices include universal serial bus (USB) memories and memory cards.

As mentioned, with the affordability of these devices, users often use multiple storage devices each storing different types of data. For example, one storage device may be used to store pictures taken with a digital camera, while another storage device stores documents related to a work project, and yet another storage device stores music or video files related to personal interest of the user. As such, different storage devices are used for various purposes and types of data.

When data is stored in different storage devices, the user must connect the storage devices to a computer and search the directories or files of the storage device to determine contents of each storage device. However, requiring a user to connect the memory device to a computer to identify files stored therein may be inconvenient for the user (especially if a computer is not available).

SUMMARY

In a general aspect, a portable memory device includes a data storage unit to store data; a control unit configured to extract information from the stored data that represents the data stored in the data storage unit based on a user setting; and a display unit to display the representative information extracted by the control unit.

The display unit may display the representative information according to a user setting.

The user setting may designate an extraction process to configure the controller to extract the representative information from the stored data.

The display unit may display the representative information independent of connection to another device.

The storage device also may include a communications interface unit configured to connect to another device to facilitate a search of the data stored in the data storage unit.

The storage device also may include a communications interface unit configured to connect to another device to modify the data stored in the data storage unit.

The data storage unit may be configured to store the data in an organized data structure, such as folder data structure and the control unit may be configured to extract the representative information using a name of a primary folder stored in the organized data structure of the storage unit. The control unit also may be configured to extract the representative information using a name of a folder last searched before the communications interface unit disconnects from the another device.

The storage device may be one of a universal serial bus (USB) memory, a memory card, and a memory stick.

The display unit may display information indicating the content of the data stored in the storage device.

The storage device also may include a user interface configured to manipulate the stored data and the display of the representative information. The display unit also may include a touch screen configured to implement the user interface. The user interface may include includes a power button to switch the display unit between power-on and power-off modes.

In another general aspect, a portable storage device includes: a data storage unit to store data; a communication interface unit configured to communicate with another device; a control unit configured to provide a search of the stored data by the another device via the communications interface and to extract, independent of any connection to the another device, information that is representative of the data stored in the data storage unit using a search history of the search of the stored data; and a display unit configured to display the extracted representative information.

The display unit may be configured to display the extracted representative information according to one of a user selection and a user setting.

The data storage unit may be configured to store the stored data in an organized data structure, such as folder data structure, and the control unit may be configured to extract the representative information from name information of a primary folder stored in the data structure of the storage unit.

In yet another general aspect, a portable storage device includes; a data storage unit to store data; a communications interface unit configured to receive information that is representative of the data stored in the data storage unit; and a display unit configured to display the received representative information.

In yet another general aspect, a method of displaying information representative of data stored in a personal, portable memory, the memory including a storage device, a controller to access the stored data, a communications interface configured to communication with another device and provide a search request to the controller from the another device, and a display, the method includes: receiving through the interface the search request from the another device when connected to the another device; determining a search history including the search request; determining whether the communications interface has been disconnected from the another device; extracting information by the controller independent of the connection to the another device that represents the data stored in the storage device based on the search history of the stored data; and displaying the extracted representative information on the display.

Displaying the extracted representative information may include displaying the extracted representative information on the display according to a user selection or user setting.

In yet another general aspect, a personal storage device includes: a housing to protect the personal storage device; a data storage unit to store data located in the housing; a communication interface unit configured to connect to another device; a control unit connected to the data storage and the communications interface, the control unit configured to: to provide access to the stored data by the another device via the communications interface; execute a search of the stored data requested by the another device; to extract, independent of any connection to the another device, information that is representative of the data stored in the data storage unit using a search history of the stored data including the executed search; and a display unit integral to an exterior of the housing and configured to display the representative information extracted by the controller.

The data storage unit may be configured to store the data in an organized data structure, such as folder data structure, and the controller may be configured to extract the representative information using a name of a folder last searched, as indicated by the search history, before the communications interface unit disconnects from the another device.

The interface may be one of a universal serial bus interface, a secure disk interface, and a serial interface.

In yet another general aspect, a portable storage device includes: a housing to protect the personal storage device; a data storage unit to store data located in the housing; a communication interface unit configured to connect to another device; a control unit connected to the data storage and the communications interface, the control unit configured to: to provide access to the stored data by the another device via the communications interface; to automatically extract, independent of any connection to the another device, from the stored data information that is representative of the data stored in the data storage unit; and a display unit integral to an exterior of the housing and configured to display the representative information extracted by the controller.

The data storage unit may be configured to store the data in an organized data structure, such as folder data structure, and the control unit may be configured to automatically extract the representative information using a name of a primary folder stored in the organized data structure of the data storage unit.

The data storage unit may be configured to store the data in an organized data structure, such as folder data structure, and the control unit may be configured to automatically extract the representative information using a name of a folder last accessed before the communications interface unit disconnects from the another device.

The interface may be one of a universal serial bus interface, a secure disk interface, and a serial interface.

However, other features and aspects will be apparent from the following description, the drawings, and the claims.

BRIEF DESCRIPTION OF THE DRAWINGS

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION

The following detailed description relates to a storage device that displays information representative of the data stored therein allowing a user to easily determine the content of the memory device. The detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
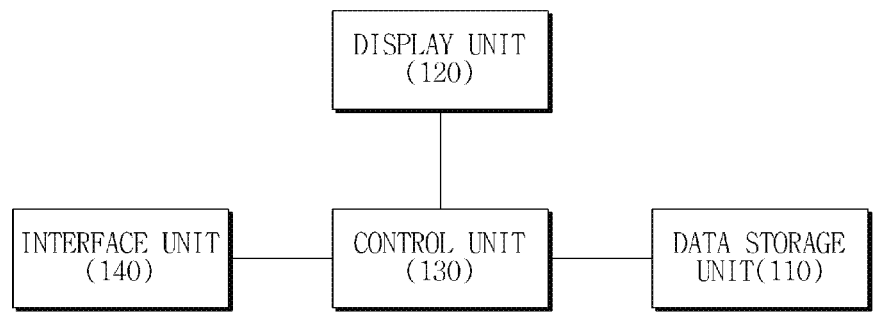
FIG. 1 is a configuration diagram of an exemplary storage device that displays information.

FIG. 1 is a block diagram of an exemplary storage device that displays information. Referring to FIG. 1, the storage device includes a data storage unit 110, a display unit 120, a control unit 130, and a communications interface unit 140.

The data storage unit 110 stores various types of user data. As referenced herein, the user data includes all forms of data that the storage device is able to store. For example, user data includes document files, music files, video files and any other types of data that may be stored in the data storage unit 110. The data stored in the storage unit 110 may be configured in a directory data structure including a plurality of folders. However, the data storage unit 110 may employ any kind of data structure generally available to storage devices. The directory type data structure including folders is described in further detail below with reference to FIG. 5.

The display unit 120 may be a liquid crystal display (LCD), an organic light emitting diode (OLED) display, or a bistable cholesteric display (BCD). The display may display contents, titles, or other identifications of information stored in the storage device. The display also may display the results and/or responses of interactions between the storage device and a user. In addition, the display unit 120 may show various types of information allowing a user to search the storage device for certain data while the user manipulates different types of user interfaces of the storage device, such as buttons and switches described in detail below.

The BCD device emits light without a backlight even when the power of the memory device is in the OFF state, and thus the BCD device may be suitable for such a storage device. In the case of an LCD device, the display unit 120 may be set to power off after a predetermined duration of time, or set to shift between power ON and OFF state every time the user touches the LCD screen.

The display unit 120 may independently display information without being connected to other devices, such as computers. The display unit 120 may display information indicative of the type of data stored in the storage device as well as a list of information or data stored in the storage device. The representative information may be any kind of information that a user wants to be shown on the display or information that is indicative overall of the data stored in the storage device. For instance, if the storage device in general stores pictures from a family trip in 2006, the representative information may be "family trip 2006." If the storage device stores business-related reference documents, the representative information may be "information for business." That is the representative information may be a name chosen in consideration of the characteristics or the intended use of the content stored by the storage device. A method of extracting the representative information from several items of information stored in the storage device is described in detail below.

The extracted representative information may be displayed by the display unit 120 driven by additional compact batteries without being connected to a host device, such as a computer. The extracted representative information also may be displayed by the display unit 120 driven by power supplied from an additional device. Therefore, unlike a conventional storage device, the storage device does not need to be connected to a host device to allow a user to browse the information. Instead, a user may view the representative information using the display unit 120. Unlike a conventional MP3 player or a portable multimedia player (PMP), the storage device shows more than a list of stored data by extracting information that represents the stored data and displaying the extracted representative information.

As described above, in the case of the BCD device, the representative information may be displayed by the self light-emitting BCD display without the need of an additional power supply. Furthermore, the display unit 120 may be set to be turned off after a predetermined period of time to save power, and the display unit 120 may be set to shift between power ON and OFF modes each time the user touches the display unit 120.

The control unit 130 extracts the information that represents data stored in the data storage unit 110 based on a history of data searched for in the data storage unit 110 or a user setting. When the user searches the data storage unit 110 for predetermined information about the data stored in the storage unit 110 while the storage unit 110 is connected to a computer or other host, the extracted representative information is transmitted to the display unit 120 for viewing by a user.

There are various methods of extracting the representative information. For example, the representative information may be extracted from name information of the primary folder at the top of a folder data structure recorded in the data storage unit 110. The primary folder may be used because generally the name associated with the primary folder represents all of the information stored within the folder structure stored in the storage device. However, in some cases, a name of a specific folder in the folder data structure may be extracted to uses as the representative information instead of the name of the primary folder. For example, the name of the specific folder that is not the primary folder may be extracted as the representative information. In this case, the name of the specific folder is extracted as the representative information that represents characteristics of the data stored in the storage device.

In another example, the storage device is connected to a host device, such as a computer, and the data storage unit 110 is searched by the host device. Once the search is complete, the representative information is extracted from the name of the folder that was last searched before the storage device is disconnected from the host device. Otherwise, a user may select any name information to be the representative information. The control unit 130 may determine the information that is selected as the representative information. However, the control unit 130 that determines the information to be extracted also may be located a device other than the storage device. In this case, the procedure to extract representative information is performed in the other device, and the storage device only shows the representative information received from the other device on its display unit 120.

The communications interface unit 140 provides a communications interface that is configured to connect to other interfaces and allow searching of the contents of the data storage unit 110 and/or to transmit and receive data with other interfaces. For example, if the storage device is a USB memory, a USB interface is provided as the communications interface unit 140. If the storage device is a memory card, a memory card interface is provided. However, any of a number of other interfaces also may be used to implement the communications interface unit 140. For example, a communications interface unit 140 of the storage device may be one of an IEEE1394 interface and a serial interface.

The communications interface unit 140 may be used as an interface to provide for control of the control unit 130, and to respond to control elements, such as control buttons disposed on the outside of the storage unit to control the control unit 130. Alternatively, the storage device may be connected to another device to control the control unit 130. The control unit 130 searches the storage device and extracts the representative information. In addition, a user may operate the control unit 130 to extract the representative information, or the control unit 130 may be controlled by the storage device in conjunction with another device to extract the representative information.

In another example, the storage device may further include a fingerprint recognizing unit (not shown, but described in further detail below). The fingerprint recognizing unit allows a user to input his/her fingerprint so that only authorized users are able to use the storage device. For example, a user can register himself/herself in the storage device by scanning a fingerprint by the fingerprint recognizing unit and registering the scanned fingerprint. Then a fingerprint of a user attempting to access the device is scanned and compared to the registered fingerprint by the fingerprint recognizing unit such that the only a user matching the registered fingerprint is authorized to use the storage device.

Figure 2:
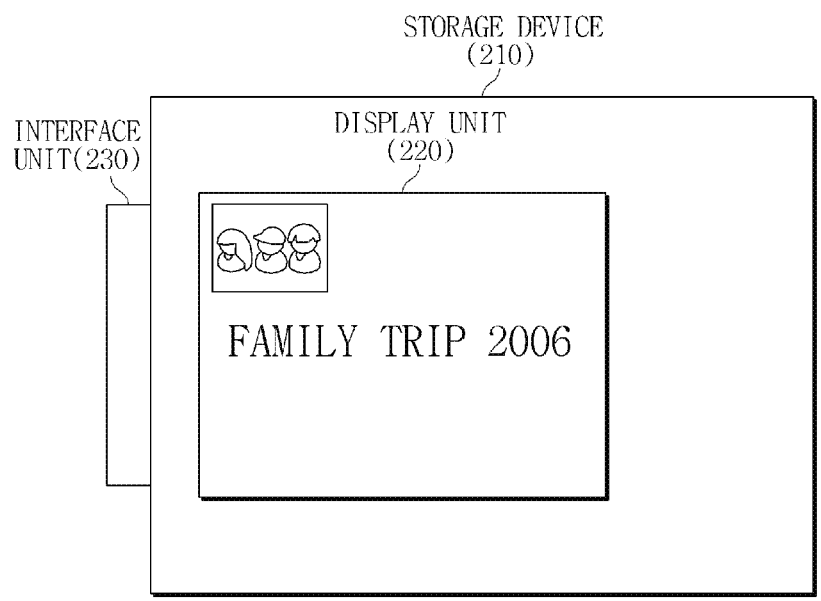
FIG. 2 is a view of an exemplary configuration of a storage device.

FIG. 2 illustrates an exemplary configuration of the storage device. As shown in FIG. 2, when the storage device 210 is implemented as a form of a memory card, a display unit 220 and an interface unit 230 may be viewed by a user. According to several methods as described above with reference to FIG. 1, once information representative of the contents stored in the storage device 210 is extracted, the extracted information is displayed by the display unit 220. For example, if most of the content stored in the storage device 210 are pictures photographed during a family trip in 2006, the display unit 220 may display the title "family trip 2006," as shown in FIG. 2.

As described above, there are several methods of extracting the representative information "family trip in 2006." For example, if the name of the primary or main folder of data stored in the memory device is "family trip 2006," the control unit 130 may extract the name of the primary folder as the representative information, or a user may choose the representative information as desired. For example, a user, intending to store pictures from a family trip in 2006 in the storage device 210, may set in advance the information "family trip 2006" to be the representative information of the storage device 210. The user also may change the representative information to whatever information the user desires even after the representative information has been automatically set by the control unit 130.

The control unit 130 also may include a representative information extraction engine to perform automatic extraction of representative information. The representative information may be extracted based on common properties among stored file names of the data storage unit. For example, based on the fact that most of the stored files were generated in 2006, a year "2006" is extracted. In addition, files have names, such as "dad," "mom," or "family," the representative information "family trip" is extracted by the extraction engine.

The extracted representative information may be displayed to the display unit 220, as shown in FIG. 2. Other examples of displaying representative information extracted by the control unit 130 of the storage device or representative information received from another device are described below.

When representative information is extracted, the extracted representative information is transmitted to a display unit 120. While the representative information is extracted, a relevant image may be associated with the representative information. Furthermore, various effects may be applied to the display of the representative information on the display unit. For example, a name or an image may be set to continuously display, appear as flowing text, or blink. Different effects or settings related to the display of the representative information may be controlled by the control unit 130 or implemented by the user through manipulation of the user interface, such as buttons provided on the storage device. In addition, other devices connected to the storage device may control the effects and settings.

Figure 3:
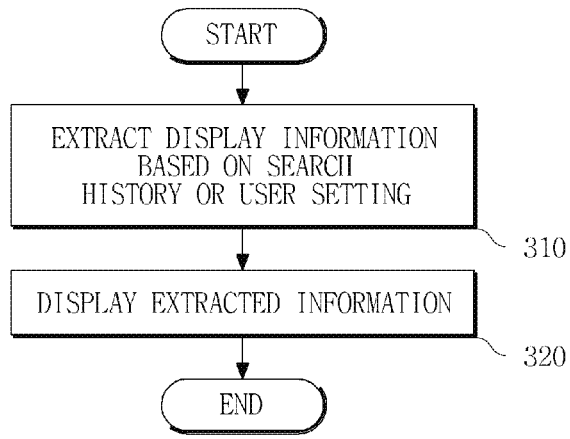
FIG. 3 is a flowchart of an exemplary method of extracting representative information for a control unit.

FIG. 3 is a flowchart of an exemplary method of extracting representative information by a control unit 130. First, based on the search history or user settings of information stored in the storage device, representative information is extracted that represents the content or data stored in the storage device (310). Various examples of how to extract the representative information have been described above with reference to FIGS. 1 and 2. For example, the extracted representative information is displayed as selected by the user, or the representative information is extracted from name information of the primary folder or from name information of the last searched folder. The extracted representative information is then independently displayed by the memory device without being connected to another host device (320).

In one example, the user may operate the control unit 130 as follows. The storage device may be connected to a computer via the communications interface unit 140, and a user may establish user settings for the control unit 130 or control the extraction of the representative information through use of the computer. In addition, the user may transmit an arbitrary title to the control unit 130 for display by the display unit 120. The user settings assigned by the user also may be used to select a representative information extraction method. For example, by changing the user settings, the user may change the representative information extracting method.

Figure 4:
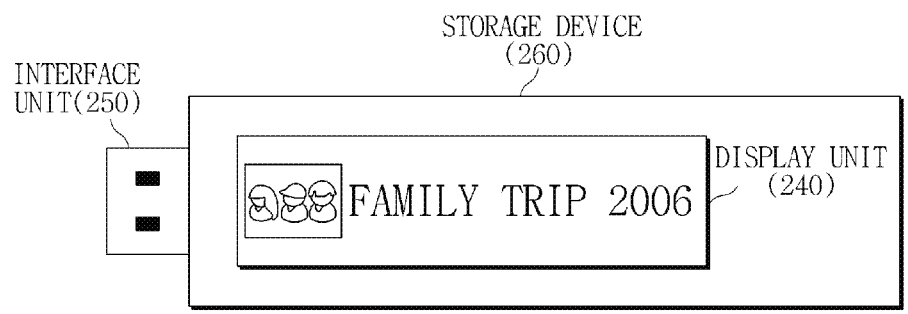
FIG. 4 illustrates an exemplary USB memory storage device.

FIG. 4 illustrates an exemplary storage device 260. The storage device 260 includes a display 240 and a USB interface 250 in a housing. USB memories are one of the most commonly used storage devices. Referring to FIGS. 2 and 4, one difference between the storage device 210 and the storage device 260 is the USB interface unit 250; however, other functions, such as extraction of representative information or user interaction through a host are not affected by the type of communications interface unit 140.

Referring to FIG. 4, the representative information of "family trip 2006" which has been extracted according to one of the above-described procedures is displayed on the display unit 240.

The card interface unit 230 and the USB interface unit 250 have been described with reference to FIGS. 2 to 4. However, since the storage device may be implemented as any one of a number of different types of portable storage devices, such as a USB memory, a secure digital (SD) card memory, and a memory stick, the communications interface 140 is not limited to the kinds of the interfaces described above.

The storage device may further include a wireless interface (not shown), such as a radio frequency (RF) module and a Bluetooth module, in addition to the communications interface units 230 or 250, such as the USB interface and the SD card interface. The RF module or the Bluetooth module may be used to access the content or data stored in the storage device and to search information to determine or change the representative information. That is, a user interface of an external device wirelessly connected to the storage device may be used to search the information identifying the content stored by the storage device, and determine and change the representative information.

Figure 5:
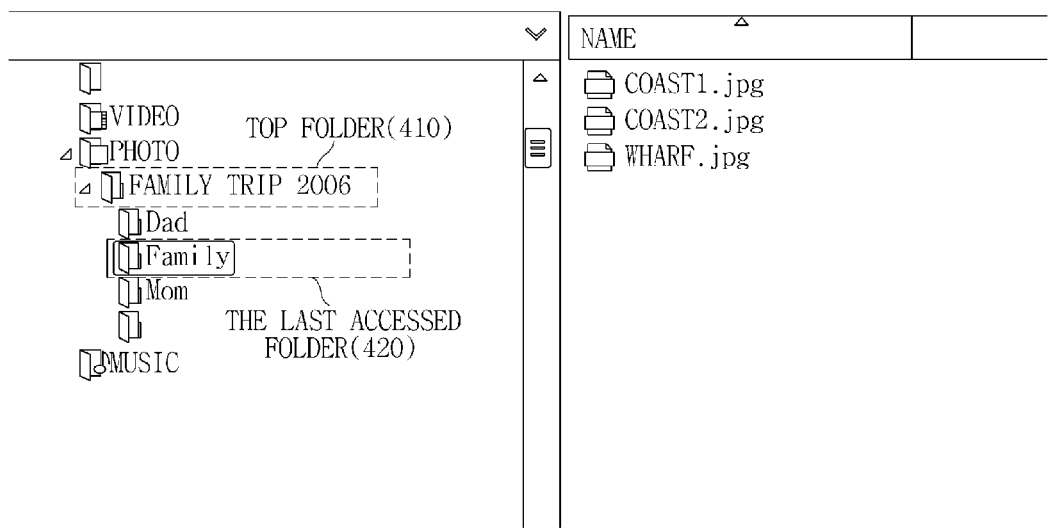
FIG. 5 illustrates an exemplary directory configuration to extract representative information.

FIG. 5 illustrates an exemplary directory data configuration that may be used to show how representative information is extracted. In this example, the storage device stores data in a directory data configuration, and the storage device stores various kinds content or data in folders arranged in the directory data structure, as shown in FIG. 5.

In this example, the representative information may be extracted based on, for example, a name of the primary folder 410, or a name of the last folder 420 searched by the host before the storage device is disconnected from the host. Since the last folder searched up to the moment before disconnection may be considered to store the last desired information the user was searching for, the name of the folder containing the data searched for by the user may be selected as the representative information and displayed, thus facilitating recollection of the user.

Figure 6:
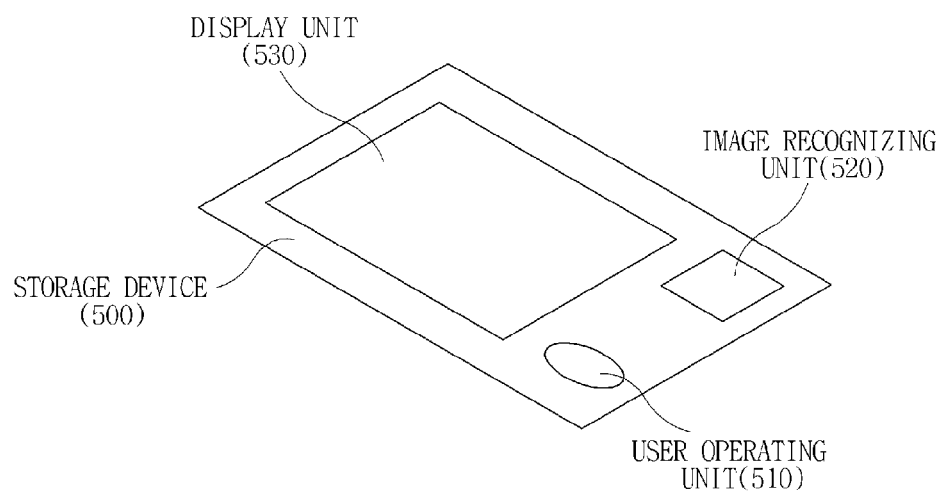
FIG. 6 illustrates exemplary control of representative information in a storage device.

FIG. 6 is an exemplary illustration of a storage device to control representative information. Referring to FIG. 6, a storage device 500 includes a user operating unit 510, an image recognizing unit 520, and a display 530.

The user interface unit 510 controls various functions of the storage device 500 and includes at least one or more buttons (not shown). The buttons may include a power-on/power-off button of the storage device 500, a power-on/power-off button of a display unit 530, and a button to change the representative information displayed on the display unit 530.

If particular representative information is currently displayed on the display unit 530, the user presses the change button of the user interface 510 to change the current representative information to different representative information. One method of changing the representative information that is displayed may include sequentially toggling through representative information and/or images in the order the representative information is stored every time the user touches the user interface unit 510. In another method, the user may directly select the representative information.

In another embodiment, the user interface unit 510 may be integral to the display unit 530. For example, when the display unit 530 is a touch screen, the user interface unit 510 may be implemented by directly operating the display unit 530 without the need for any additional buttons. In one example, a touch-screen type display unit 530 may display a folder data structure indicating the storage information in the storage device 500, as shown in FIG. 4. The user may select one of folders to change the representative information on the display unit 530.

The image recognizing unit 520 may be used to recognize fingerprints, pupils (e.g., irises), or any other characteristics of a user and prevent unauthorized users from accessing the storage device 500. For example, when a user initially uses the storage device 500, the user touches his/her finger to the image recognition unit 520 to register the fingerprint of the user, the image recognition unit 520 generates a scanned image of the fingerprint, and the scanned fingerprint is stored in the storage device 500. After the initial use, when access of the information stored on the storage device is attempted to, the scanned fingerprint image stored in the storage device is compared to the fingerprint of a current user scanned by the image recognition unit 520 to determine whether the current user is authorized to use the storage device 500. When it is determined that the current user of the storage device 500 is not an initially registered user, an error message is generated and displayed on the display unit 530 to prohibit the current user from using the storage device. The image recognizing unit 520 also may be formed as a part of the buttons provided on the user interface unit 510. However, the image recognizing unit 520 and the user interface unit 510 are not required and may be selectively implemented according to the purpose of the storage device.

Figure 7:
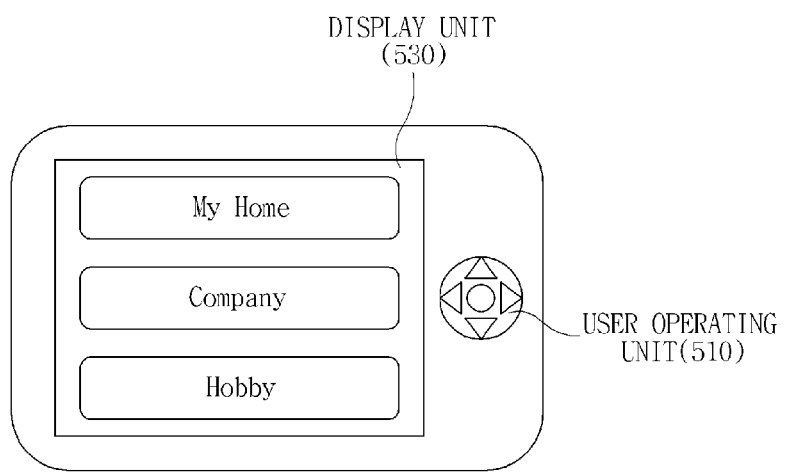
FIG. 7 is an exemplary image displayed on a display unit.

FIG. 7 illustrates an exemplary display including images shown a display unit of the storage device. As shown in FIG. 7, several items of representative information that a user prefers or frequently uses are displayed, and a user may directly select a desired item from the display items of representative information on a screen.

As described herein, the storage device allows a user to easily determine what information is stored in a storage device.

The above-mentioned representative information display method according to the present embodiment may be stored in any form of recording media, such as a compact disk-read only memory (CD-ROM), a RAM, a ROM, a floppy disk, a hard disk, or a magneto-optical disk, or in any computer-readable form, such as a computer code organized into executable programs.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A portable storage device comprising:
a data storage unit configured to store data;
control unit configured to provide a search of the stored data by another device to generate a search history and to extract, independent of any connection to the another device, information from the stored data that represents the data stored in the data storage unit based on the search history of the stored data;
a display unit configured to display the representative information extracted by the control unit, wherein the portable storage device is connectable to the another device that controls the control unit, and
wherein the data storage unit is configured to store the data in an organized data structure including folder data structure, and the control unit is configured to extract the representative information using a name of a user-defined primary folder stored in the organized data structure of the storage unit.

2. The storage device of claim 1, wherein a user setting designates an extraction process to configure the control unit to extract the representative information from the stored data.

3. The storage device of claim 2, wherein the display unit displays the representative information independent of connection to another device.

4. The storage device of claim 1, further comprising a communications interface unit configured to connect to the another device to facilitate a search of the data stored in the data storage unit.

5. The storage device of claim 4, wherein the data storage unit is configured to store the data in an organized data structure including folder data structure, and the control unit is configured to extract the representative information using a name of a folder last searched before the communications interface unit disconnects from the another device.

6. The storage device of claim 1, further comprising a communications interface unit configured to connect to the another device to modify the data stored in the data storage unit.

7. The storage device of claim 1, wherein the storage device is one of a universal serial bus memory, a memory card, and a memory stick.

8. The storage device of claim 1, wherein the display unit displays information indicating the content of the data stored in the storage device.

9. The storage device of claim 1, further comprising a user interface configured to manipulate the stored data and the display of the representative information.

10. The storage device of claim 9, wherein the display unit includes a touch screen configured to implement the user interface.

11. The storage device of claim 9, wherein the user interface includes a power button to switch the display unit between power-on and power-off modes.

12. The storage device of claim 1, wherein the portable storage device is a memory card or a memory stick.

13. The storage device of claim 12, wherein the portable storage device excludes being a USB flash drive.

14. The storage device of claim 1, wherein the representative information relates to a name chosen in consideration of a characteristic of the stored data.

15. The storage device of claim 1, wherein the representative information appears as blinking text.

16. The storage device of claim 1, further comprising a fingerprint recognizing unit to scan a fingerprint of a user to authorize users to be able to use the portable storage device.

17. A portable storage device comprising:
a data storage unit configured to store data;
a communication interface unit configured to communicate with another device;
a control unit configured to provide a search of the stored data by the another device via the communications interface and to extract, independent of any connection to the another device, information that is representative of the data stored in the data storage unit using a search history of the stored data; and
a display unit configured to display the extracted representative information,
wherein the portable storage device is connectable to the another device that controls the control unit,
wherein the display unit is configured to display the extracted representative information according to one of a user selection and a user setting, and
wherein the data storage unit is configured to store the stored data in an organized data structure including folder data structure, and the control unit is configured to extract the representative information from name information of a user-defined primary folder stored in the data structure of the storage unit.

18. The storage device of claim 17, wherein the control unit is configured to extract the representative information using a name of a folder last searched before the communication interface unit disconnects from the another device.

19. A portable storage device comprising:
a data storage unit to store data;
a communications interface unit configured to receive information that is representative of the data stored in the data storage unit;
a control unit configured to provide a search of the stored data by another device to generate a search history and to extract, independent of any connection to the another device, information that is representative of the data stored in the data storage unit based on the search history of the stored data;
a display unit configured to display the received representative information,
wherein the portable storage device is connectable to the another device that controls the communications interface unit,
wherein the display unit displays the representative information according to one of a user selection or a user setting, and
wherein the data storage unit is configured to store the data in an organized data structure including folder data structure, and the control unit is configured to extract the representative information using a name of a user-defined primary folder stored in the organized data structure of the storage unit.

20. The storage device of claim 19, wherein the communications interface unit is configured to extract the representative information using a name of a folder last searched before the communications interface unit disconnects from another device.

21. A method of displaying information representative of data stored in a personal, portable memory, the memory including a storage device, a controller to access the stored data, a communications interface configured to communication with another device and provide a search request to the controller from the another device, and a display, the method comprising:
receiving through the interface the search request from the another device when connected to the another device;
determining a search history including the search request;
determining the communications interface has been disconnected from the another device;
extracting information by the controller that represents the data stored in the storage device based on the search history of the stored data; and
displaying the extracted representative information on the display,
wherein the storage device is connectable to the another device that controls the controller, and
wherein the data storage unit is configured to store the data in an organized data structure including folder data structure, and the control unit is configured to extract the representative information using a name of a user-defined primary folder stored in the organized data structure of the storage unit.

22. The method of claim 21, wherein in the displaying the extracted representative information includes displaying the extracted representative information on the display according to a user selection or user setting.

23. The method of claim 21, wherein the extracting of the representative information uses a name of a folder last searched before the communications interface disconnects from the another device.

24. A portable storage device comprising:
a housing to protect the portable storage device;
a data storage unit to store data located in the housing;
a communication interface unit configured to connect to another device;
a control unit connected to the data storage and the communications interface, the control unit being configured to:
provide access to the stored data by the another device via the communications interface;
execute a search of the stored data requested by the another device; and
extract, independent of any connection to the another device, information that is representative of the data stored in the data storage unit using a search history of the stored data including the executed search; and
a display unit integral to an exterior of the housing and configured to display the representative information extracted by the control unit ,
wherein the portable storage device is wirelessly connectable to the another device that controls the control unit,
wherein the display unit displays the representative information according to a user setting, and
wherein the data storage unit is configured to store the data in an organized data structure including folder data structure, and the control unit is configured to extract the representative information using a name of a folder last searched, as indicated by the search history, before the communications interface unit disconnects from the another device.

25. The storage device of claim 24, wherein the communications interface is one of a universal serial bus interface, a secure disk interface, and a serial interface.

26. A portable storage device comprising:
a housing configured to protect the personal storage device;
a data storage unit configured to store data located in the housing;
a communication interface unit configured to connect to another device;
a control unit connected to the data storage and the communications interface, the control unit being configured to:
provide access to the stored data by the another device via the communications interface;
execute a search of the stored data requested by the another device to generate a search history; and
extract, independent of any connection to the another device, from the stored data information that is representative of the data stored in the data storage unit based on the search history of the stored data;
a display unit integral to an exterior of the housing and configured to display the representative information extracted by the control unit,
wherein the portable storage device is connectable to the another device that controls the control unit, and
wherein the data storage unit is configured to store the data in an organized data structure including folder data structure, and the control unit is configured to automatically extract the representative information using a name of a user-defined primary folder stored in the organized data structure of the data storage unit.

27. The storage device of claim 26, wherein the communications interface is one of a universal serial bus interface, a secure disk interface, and a serial interface.

28. A portable storage device comprising:
a housing configured to protect the personal storage device;
a data storage unit configured to store data located in the housing;
a communication interface unit configured to connect to another device;
a control unit connected to the data storage and the communications interface, the control unit being configured to:
provide access to the stored data by the another device via the communications interface;
execute a search of the stored data requested by the another device device to generate a search history; and extract, independent of any connection to the another device, from the stored data information that is representative of the data stored in the data storage unit based on the search history of the stored data;

a display unit integral to an exterior of the housing and configured to display the representative information extracted by the control unit, wherein the portable storage device is connectable to the another device that controls the control unit, and wherein the data storage unit is configured to store the data in an organized data structure including folder data structure, and the control unit is configured to automatically extract the representative information using a name of a folder last accessed before the communications interface unit disconnects from the another device.

* * * * *